United States Patent
Andrysco et al.

(10) Patent No.: US 9,489,928 B2
(45) Date of Patent: Nov. 8, 2016

(54) ADJUSTMENT OF MONITOR RESOLUTION AND PIXEL REFRESHMENT BASED ON DETECTED VIEWER DISTANCE

(71) Applicant: INTEL CORPORATION, Santa Clara, CA (US)

(72) Inventors: Nathan R. Andrysco, Chandler, AZ (US); Kevin L. Lin, Chandler, AZ (US)

(73) Assignee: INTEL Corporation, Santa Clara, CA (US)

( * ) Notice: Subject to any disclaimer, the term of this patent is extended or adjusted under 35 U.S.C. 154(b) by 242 days.

(21) Appl. No.: 14/139,536

(22) Filed: Dec. 23, 2013

(65) Prior Publication Data
US 2015/0179150 A1    Jun. 25, 2015

(51) Int. Cl.
G09G 5/391    (2006.01)
G06F 3/00    (2006.01)

(52) U.S. Cl.
CPC .............. *G09G 5/391* (2013.01); *G06F 3/005* (2013.01); *G09G 2320/0261* (2013.01); *G09G 2340/0407* (2013.01)

(58) Field of Classification Search
CPC .............. G09G 5/391; G09G 2320/0261; G09G 2340/0407; G06F 3/005
See application file for complete search history.

(56) References Cited

U.S. PATENT DOCUMENTS

| | | | | |
|---|---|---|---|---|
| 6,597,329 B1* | 7/2003 | Moss | ...................... | G06F 3/147 345/204 |
| 2003/0052903 A1 | 3/2003 | Weast | | |
| 2005/0062767 A1* | 3/2005 | Choe | .................... | G09G 3/3607 345/694 |
| 2006/0066595 A1* | 3/2006 | Sampsell | ............. | G09G 3/3466 345/204 |
| 2008/0074444 A1* | 3/2008 | Morikawa | .............. | G09G 5/005 345/660 |
| 2009/0256799 A1* | 10/2009 | Ohkami | ............... | G09G 3/3433 345/107 |
| 2011/0279482 A1* | 11/2011 | Neal | ..................... | G09G 3/3426 345/690 |
| 2014/0118354 A1* | 5/2014 | Pais | ....................... | G09G 5/373 345/428 |

OTHER PUBLICATIONS

Mirasol, "Competitive Display Technologies", White Paper, Jun. 2009, 20 pages.
Wikipedia, the free encyclopedia, "Gaussian blur", retrieved from URL: "http://en.wikipedia.org/w/index.php?title=Gaussian_blur &oldid=586539836" on Dec. 18, 2013, pp. 1-5.
Mobileread Forums, "My first irritating Kindle 2 gripe", Feb. 25, 2009, pp. 1-6.
Pocketnow, "NVIDIA Tegra 3 Chips Will Offer Power-Saving Display Hack", Nov. 18, 2011, pp. 1-3.
Wikipedia, the free encyclopedia, "Retina Display", retrieved from URL: "http://en.wikipedia.org/w/index.php?title=Retina_Display &oldid=586651635" on Dec. 19, 2013, pp. 1-2.

* cited by examiner

*Primary Examiner* — Ryan A Lubit
(74) *Attorney, Agent, or Firm* — Finch & Maloney PLLC

(57) ABSTRACT

Techniques are disclosed for improving energy efficiency of displays, and in particular, displays capable of selective refresh. In an embodiment, the techniques include adjusting the effective resolution of a display based on the viewer's distance from the display. The effective resolution adjustment can be accomplished by, for example, grouping individual pixels or blurring the display buffer (or both pixel grouping and blurring) based on the viewer's distance from the display. Such an adjustment has the effect of creating enlarged pixels from a plurality of smaller pixels. In any such cases, each of the enlarged pixels (also called macro-pixels) can then be selectively refreshed based on changes from the previous frame. In addition, even if one of the macro-pixels has changed from the last frame, it also need not be refreshed if the viewer would not perceive that change given a subtle or otherwise unperceivable difference in intensity.

21 Claims, 6 Drawing Sheets

ADJUSTMENT OF MONITOR RESOLUTION AND PIXEL REFRESHMENT BASED ON DETECTED VIEWER DISTANCE

BACKGROUND

In modern mobile computing devices (such as phones, tablets, and laptops), the power cost to run the display is often more than running the other system components combined. Electrophoretic displays or so-called E-Ink was perhaps the first commercialized display technology to minimize the cost to power a device's display. This was done by moving away from the longstanding backlit liquid crystal display (LCD) technology, which remains a dominant display form factor of mobile devices. E-Ink displays (sometimes also referred to as electronic paper displays) effectively reduce power in two ways. First, E-Ink displays remove the need for a backlight as they are illuminated by the natural light of the environment. Second, LCDs (and other older display technologies) are refreshed at about 60 times per second, with each pixel refresh costing some amount of power. Due to each of these pixels being unable to hold a charge for very long, this refresh must occur regardless of whether the pixel's color needs to be changed or not. Conversely, the E-Ink technology can maintain a pixel's state without additional energy, which eliminates the need to refresh an unchanged pixel and therefore conserves power.

DETAILED DESCRIPTION

Figure 1:
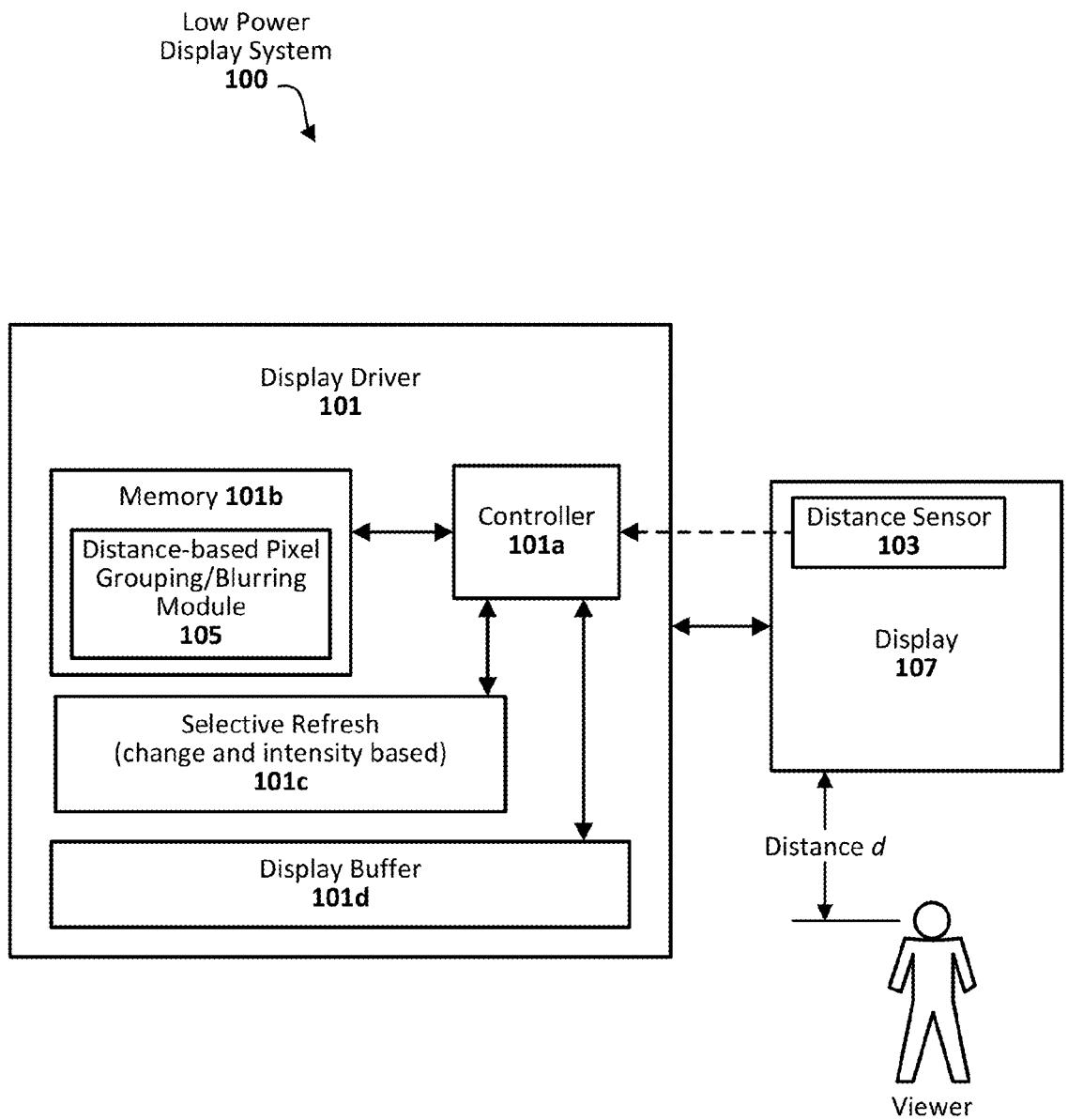
FIG. 1 illustrates a low power display system configured in accordance with an embodiment of the present disclosure.

Techniques are disclosed for improving energy efficiency of displays, and in particular, displays capable of selective refresh such as E-Ink displays and the like. In an embodiment, the techniques include adjusting the effective resolution of a given display based on the viewer's distance from the display. The adjustment to the effective resolution can be accomplished, for instance, by grouping individual pixels and treating each pixel group as a single enlarged pixel, thereby decreasing the number of pixels that need to be individually interrogated for purposes of refreshing the display. The number of pixels in a group generally depends on the distance of the viewer from the display (e.g., the farther away, the more pixels in the group). In another example case, the adjustment to the effective resolution can be accomplished by blurring the display buffer based on the viewer's distance from the display, which also has the effect of creating an enlarged pixel from a plurality of smaller pixels that essentially blur together. The degree of blurring generally depends on the distance of the viewer from the display. In any such cases, each of the enlarged pixels (also called macro-pixels herein) can then be selectively refreshed based on changes from the previous frame (if a macro-pixel has not changed from the last frame, then it need not be refreshed). In addition, even if one of the macro-pixels has changed from the last frame, it also need not be refreshed if the viewer would not perceive that change given a subtle or otherwise unperceivable difference in intensity (e.g., a change in a macro-pixel from black to dark blue that is likely not perceivable). As will be appreciated in light of this disclosure, the techniques are particularly useful for mobile devices that have a constraint on available power (battery). Numerous embodiments will be apparent in light of this disclosure.

General Overview

An E-Ink-like display has a number of properties that differ from LCDs and other backlit displays (e.g., LED, plasma, etc) that can be exploited to improve upon the display's energy efficiency. In particular, unlike backlit displays, E-Ink-like displays can be selectively refreshed in that they do not need to refresh each pixel 60 times a second. Rather, instead of refreshing the entire screen when any pixel from the previously rendered frame buffer changes, these E-Ink-like displays can instead do a targeted refresh. This targeted refresh entails a quick image compare to determine which pixels are different from the previous frame so that a refresh-mask is produced. Using that mask, only the pixels that need refreshing will be updated, thus minimizing the energy update cost of the display. This in itself can be a substantial power savings for static images (e.g., non-game and non-video applications), since most pixels remain unchanged after a screen refresh.

In accordance with an embodiment of the present disclosure, an even greater power savings can be realized by effectively being even more selective in the refresh process, by considering how the viewer (person) will perceive the image given that viewer's distance from the display. This distance can be detected, for instance, via a camera or infrared distance sensor or an ultrasonic sensor. In some cases, the distance can be a distance between the display and the viewer's face (e.g., using the eyes or nose of the viewer's face as the measurement point). Alternatively, the distance can be user-configurable or otherwise provided by the viewer (e.g., via a user interface screen). In still other embodiments, a typical viewing distance of about 18 to 24 inches from the viewer's face to the display can be assumed. In any such cases, once this distance is known, the effective size of the display pixels can be enlarged accordingly (e.g., 1.5×, 2×, 2.25×, etc), under the assumption that the effective pixel size change (or effective decrease in resolution) will not be noticeable or otherwise bothersome to the viewer at the given viewing distance.

In some embodiments, the display pixels can be enlarged by combining two or more individual or so-called actual pixels to make a single enlarged pixel or a so-called macro-pixel, thereby reducing the number of pixels that have to be individually interrogated. Each individual pixel making up a macro-pixel can thus receive the same drive signal. In one such example embodiment, the drive signal reflects the average of the pixel colors making up that macro-pixel. So, for instance, if each macro-pixel includes a 2×2 block of individual pixels, and one such block would normally include four distinct shades of red (one shade for each of the four individual pixels), then that macro-block will be a single shade of red that reflects the average of the four distinct shades of red. As will be appreciated in light of this disclosure, given limitations of human vision and the known viewing distance, the viewer will likely not notice the change in granularity of the pixilation. As will be further appreciated, the number of pixels in a group can generally depend on the distance of the viewer from the display (e.g., the farther away, the more pixels in the group). Even if the viewer can detect the changes in pixilation, that person may generally find those perceptible changes to be a fair trade, given the benefit of power conservation.

Each of the enlarged pixels can then be selectively refreshed based on changes from the previous frame. In particular, if a macro-pixel has not changed from the last frame, then it need not be refreshed). In addition, and in accordance with some embodiments, even if one of the macro-pixels has changed from the last frame, it also need not be refreshed if the viewer would likely not perceive that change given a subtle or otherwise unperceivable difference in intensity. For instance, a change in a given macro-pixel from black in one frame to dark blue in the next frame is likely not perceivable to the ordinary viewer. As such, even though the macro-pixels are different, that difference would not be appreciated by the viewer, and refreshing of that macro-pixel is thus unnecessary.

In another example embodiment, the display pixels can be effectively enlarged by blurring the display buffer based on the viewer's distance from the display, which also has the effect of creating an enlarged pixel from a plurality of smaller pixels that essentially blur together. So, because of the blurring, neighboring pixels become more similar in intensity. This in turn provides more opportunities to detect perceived intensity similarities from frame to frame. If the perceived intensity similarity is within a desired range (e.g., 90% or more similar, or otherwise where the average viewer likely cannot perceive the difference between a current pixel intensity and the previous intensity for that pixel at the given viewing distance), then that pixel need not be refreshed.

Thus, the number of pixels that need to be refreshed can be greatly reduced when considering the viewer's distance from the display screen. In some embodiment, the techniques may be further configured to account for a person's visual impairments. For instance, assume the user/viewer has a known vision impairment, such as near-sightedness or far-sightedness or some other vision impairment that is quantifiable using established vision prescription standards. In some such cases, the user can input his/her impairment data (e.g., 20/40 with corrective lenses) using a user interface. This vision impairment data can then be used to modify the established viewing distance data to allow for an even greater reduction in effective resolution (or said differently, even larger pixels) without a user perceived difference in the rendering quality.

As will be appreciated in light of this disclosure, the techniques are particularly useful for mobile devices that have a constraint on available power (battery). However, the techniques may be implemented on any display technology having selective refresh capability where only a sub-set of display pixels are refreshed when there are no perceivable differences in that pixel from one frame to the next. An unperceivable difference is intended to generally refer to a difference that an ordinary viewer would not readily detect under normal display viewing conditions, at a given viewing distance. It is understood, however, that a person that is particularly sensitive to display characteristics may perceive differences and possibly find those differences unacceptable. Numerous variations and embodiments will be apparent in light of this disclosure.

System Architecture

FIG. 1 illustrates a low power display system 100 configured in accordance with an embodiment of the present disclosure. As can be seen, the system 100 includes a display driver 101 that is configured to receive distance information from a distance sensor 103 and to drive display 107, which is a pixelated display capable of being selectively refreshed. In one example embodiment, the display 107 is an electrophoretic display, or any other selectively refreshable display. Note that the display 107 need not be backlit. As will be appreciated in light of this disclosure, the distance sensor 103 need not be part of display 107 but can be part of display driver 101 or positioned elsewhere within system 100, in various embodiments. The driver 101 includes a number of components, including a controller 101*a*, a memory 101*b*, a selective refresh module 101*c*, and a display buffer 101*d*. In addition, the memory 101*b* includes a distance-based pixel grouping/blurring (DBPG) module 105, which is executable by controller 101*a* (or some other processor or processor set) and programmed to enhance the refresh selectivity, as explained herein.

While the DBPG module 105 is shown implemented as software, it could also be implemented in hardware (e.g., gate level logic or purpose built semiconductor), firmware (e.g., routines embedded in a microcontroller having input/output capability), or some combination of hardware, software and firmware, as will be appreciated in light of this disclosure. The selective refresh module 101*c* may also be implemented with software, firmware, hardware, or some combination thereof.

As will be further appreciated, the degree of integration may vary from one embodiment to the next, and the example configuration shown in FIG. 1 is not intended to be limiting. For instance, in other embodiments, the DBPG module 105 may be integrated with the selective refresh module 101*c*. Likewise, the driver 101 may be integrated with display 107 or a mobile computing system (e.g., such as a laptop, tablet or smart phone), or both such as the case where the driver 101 is integrated within the display of a tablet or smart phone. In still another embodiment, the selective refresh module 101*c* may be implemented with two modules—one configured to carry out selective refresh based on unchanged pixels, and the other being configured to carry out selective refresh of pixels based on user-perceivable intensity changes. While the techniques provided herein are particularly useful in conserving power in mobile display devices, they could also readily be used in desktop and other such non-mobile display systems, if so desired.

In any such cases, the DBPG module 105 can be configured to help improve energy usage by decreasing the number of pixels that need to be updated (refreshed) when their states have not changed from one frame to the next, as well as when their states do change from one frame to the next but unperceivably so, based on the distance of the user (viewer) from the display 107. This reduction in the number of pixels that need to be refreshed can be accomplished by the DBPG module 105 by, for example, effectively enlarging the pixels of the display 107 via pixel grouping or blurring (or both), wherein the degree of the enlarging depends on the distance of the user from the display 107, as indicated by the sensor 103. As will be appreciated in light of this disclosure, this effective pixel enlargement reduces the number of pixels that need to be individually interrogated by the selective refresh module 101c. For example, and with respect to pixel grouping, the individual pixels making up that enlarged pixel (or so-called macro-pixel) can all be treated the same (e.g., the drive signal to those pixels is the same and represents a color that is the average of all the colors in that pixel group). Likewise, and with respect to pixel blurring, neighboring pixels become more similar in intensity, which allows for intensity-based refresh selectivity.

As will be further appreciated in light of this disclosure, note that the underlying hardware pixel driver hardware can be designed to update a given pixel group together with a single driver signal rather than individually driving each pixel with its own signal, which may also decrease and therefore save power. For example, rather than switching in four distinct copies of the same drive signal to the corresponding drive input for each of four individual pixels making up a given macro-pixel, the driver 101 and/or display 107 could be configured with normally-closed switch positions that tie the drive input for each of the individual pixels of a pixel group together to a common drive line. So, when the enlarged pixel mode is enabled (based on viewer distance from the screen, as provided herein), those switches can be de-energized to their normally-closed position and the common drive line can be provided with the drive signal for the macro-pixel. When the enlarged pixel mode is disabled, those same switches can be energized to their normally-open position thereby disconnecting from the common drive line and allowing for individual pixel drive lines. Numerous such configurations will be apparent in light of this disclosure.

Table 1 below illustrates an example look-up table (LUT) that the DBPG module 105 can be configured with or otherwise have access to, so that the distance (d) provided by the sensor 103 can be correlated to an effective pixel size for a given user. In this way, the give distance d can be used as in index into the LUT. Other embodiments may correlate a given distance d to pixel grouping/blurring using any other suitable database or logic, and the present disclosure is not intended to be limited to any particular memory structure or control logic (e.g., if-then-else loops, etc).

TABLE 1

| LUT Correlating Display Distance to Pixel Grouping/Blurring % | | |
|---|---|---|
| Distance d (inches) | Pixel Group | Blur % |
| d < 15 | N/A | N/A |
| 15 ≤ d < 18 | 2 × 2 | 10 |
| 18 ≤ d < 22 | 2 × 2 | 15 |
| 22 ≤ d < 24 | 3 × 3 | 20 |
| 24 ≤ d < 26 | 3 × 3 | 30 |
| 26 ≤ d < 30 | 4 × 4 | 40 |
| d ≥ 30 | 4 × 4 | 50 |

As can be seen in the example embodiment reflected in Table 1, distances under 15 inches do not engage the pixel enlarging function and selective refreshing of those enlarged pixels based on distance, as provided herein. Other embodiments may optionally offer blurring at this distance, but not pixel grouping, for instance. Continuing with the Table 1 entries, at a distance of 15 to about 18, the DBPG module 105 can group individual pixels into 2×2 blocks so as to form macro-pixels that each includes four individual pixels. Alternatively, or in addition, rather than grouping pixels, the DBPG module 105 can blur the display buffer 101d, so as to effectively increase the pixel size by about 10% given the blur-induced similarities in intensity of neighboring pixels. As can be further seen, at a distance of 18 to about 22, the DBPG module 105 can similarly group individual pixels into 2×2 blocks. Alternatively, or in addition, the DBPG module 105 can blur the display buffer 101d, so as to effectively increase the pixel size by about 15% given the blur-induced similarities in intensity of neighboring pixels. At a distance of 22 to about 24, the DBPG module 105 can group individual pixels into 3×3 blocks so as to form macro-pixels that each includes nine individual pixels. Alternatively, or in addition, the DBPG module 105 can blur the display buffer 101d, so as to effectively increase the pixel size by about 20%. At a distance of 24 to about 26, the DBPG module 105 can group individual pixels into 3×3 blocks so as to form macro-pixels that each includes nine individual pixels. Alternatively, or in addition, the DBPG module 105 can blur the display buffer 101d, so as to effectively increase the pixel size by about 30%. At a distance of 26 to about 30, the DBPG module 105 can group individual pixels into 4×4 blocks so as to form macro-pixels that each includes sixteen individual pixels. Alternatively, or in addition, the DBPG module 105 can blur the display buffer 101d, so as to effectively increase the pixel size by about 40%. At distances greater than or equal to 30, the DBPG module 105 can group individual pixels into 4×4 blocks so as to form macro-pixels that each includes sixteen individual pixels. Alternatively, or in addition, the DBPG module 105 can blur the display buffer 101d, so as to effectively increase the pixel size by about 50%. As will be appreciated in light of this disclosure, numerous other pixel grouping and blurring schemes can be used, and the present disclosure is not intended to be limited to any particular ones. For instance, while symmetrical pixel groups are used in Table 1, other embodiments may use non-symmetrical pixel groups (e.g., 2×1 pixel groups, 2×4 pixel groups, etc).

Figures 4, 5:
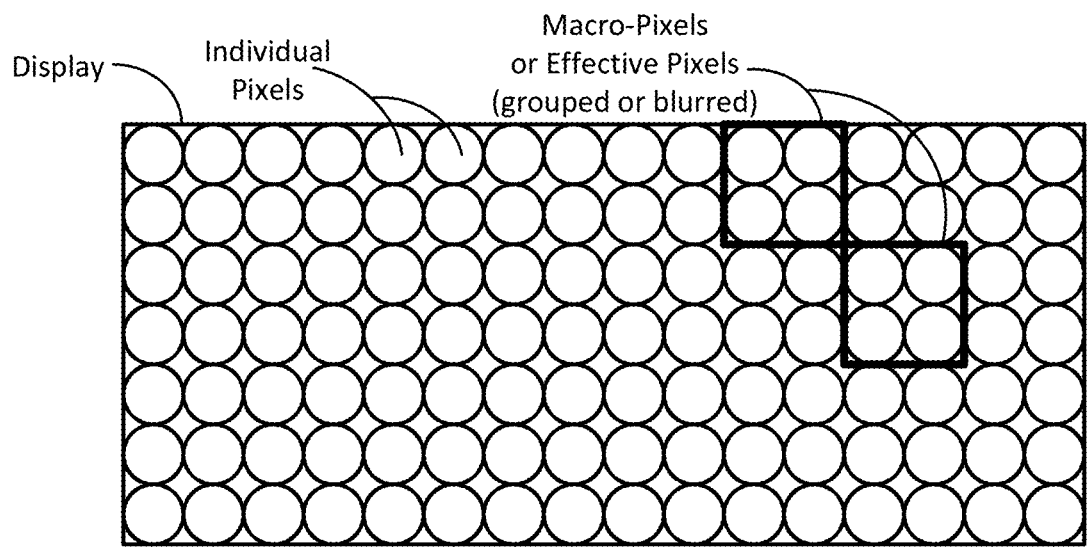
FIG. 4 illustrates a pixelated display that can be selectively refreshed in accordance with an embodiment of the present disclosure.
FIG. 5 illustrates an example user interface that can be used to configure a computing system for selectively refreshing a display based on viewer distance from the display, in accordance with an embodiment of the present disclosure.

In the example embodiment of FIG. 1, the distance d is detected via the distance sensor 103, which may be, for example, a camera or infrared distance sensor or any other device having the ability to provide a distance value or a sensor data that can be used to compute a distance value between the viewer and the screen. In some embodiments, the sensor 103 may be embedded within the display 107, but may also be operatively coupled to the display 107 in an external fashion or otherwise provisioned proximate to the display 107 so as to provide an accurate distance measurement. In one specific embodiment, the sensor 103 (or a supporting driver or application) is programmed or otherwise configured to identify the viewer's face and to target the distance to a feature on the viewer's face, such as the nose or forehead or eyes or some combination of facial features. This can be accomplished, for example, using any suitable facial recognition applications or systems currently available. The distance d may also be specified in other ways, as previously explained. For example, the distance d can be user-configurable or otherwise provided by the viewer (e.g., via a user interface screen, such as shown in FIG. 5 and will be discussed in turn). In still other embodiments, a typical viewing distance in the range of about 18 to 30 inches from the viewer's face to the display 107 can be assumed or otherwise hard-coded into the DBPG module 105. For instance, the distance d can be hard-coded at 24 inches. The degree of hard-coding versus user configurability and/or sensor-based measurement can vary from embodiment to embodiment, as will be appreciated. Note that the computational power expended on the distance calculation is relatively low compared to power saved via the efficient display techniques provided herein. As will be further apparent in light of this disclosure, an alternative to using a camera-like display with image recognition may be to use infrared or ultrasonic sensors that may use less power than camera-based sensing. Again, such sensors can be part of the display 107 or be a separate module that can be operatively attached to or otherwise deployed proximate to the display 107 (via clip or other suitable fastener) so as to provide a sufficiently accurate distance measurement from the display screen to the viewer's face (or other targeted area).

In cases where the user has specified a vision impairment (if applicable, such as via a user interface as shown in FIG. 5), the reported distance d from the sensor can be modified with a scaling factor representative of the impairment. So, for example, if the user has indicated 20/40 vision (with corrective lenses in place), then the distance d reported by sensor 103 (or otherwise provided to the system 100) can be multiplied by a factor of 1.2 (or some other suitable factor). For instance, given a reported distance d of 20 inches, an impairment factor of 1.2 will operate to modify that measured distance d to 24 inches (i.e., 20 in×1.2=24 in). The DBPG module 105 can then use the resulting 24 inches as the index into the LUT (Table 1), thereby providing a pixel grouping of 3×3 (rather than a pixel grouping of 2×2 for the unmodified distance of 20 in).

In some embodiments, if the distance to the viewer is ambiguous because, for instance, the display 107 is tilted (e.g., where the bottom portion of the display is closer to the viewer than the top portion) or the tolerance on the distance measurement is relatively high (e.g., +/−0.5 in or higher), then the DBPG module 105 can be configured to pick the closest distance. Such a conservative approach can be used to best maintain the user experience, since if the further distance is chosen, the pixels might be put into larger groups, and subsequently they will be more noticeable. Similarly for a multi-viewer scenario, the DBPG module 105 can be configured to conservatively pick the person closest to the display 107. In any such scenarios, the DBPG module 105 can also be configured to take into account the vision impairment factors of the viewer or viewers (if known or otherwise provided to the system 100). So, to be conservative, the DBPG module 105 can be configured to choose the distance+impairment factor that results in the smallest effective pixels (e.g., choose 1×2 over 2×2). In a more general sense, the DBPG module 105 can be configured to conservatively select a safe distance (e.g., the shortest measurable distance) when the primary or target distance cannot be determined with suitable confidence for whatever reason.

The controller 101a and memory 101b can be implemented with any suitable processor and memory technology, as will be appreciated in light of this disclosure. In some embodiments, the memory 101b may be integrated with the controller 101a. The controller 101a is capable of accessing software from the memory 101b and executing that software. In this example embodiment shown, the controller 101a is configured to execute the DBPG module 105. The display buffer 101d (sometimes referred to as a frame buffer in the literature) can also be generally implemented with conventional technology. As indicated herein, the contents of the display buffer 101d can be subjected to a blurring function, so as to have the effect of enlarging pixel size.

The selective refresh module 101c of this example embodiment is configured to carry out two types of selective refresh: one for pixels that have not changed and one for pixels that have changed but not in a way that is readily perceptible to a human having ordinary viewing capability. With respect to the first type of selective refresh, instead of refreshing the entire screen when any pixel from the previously rendered frame buffer changes, the display system 100 can instead do a targeted refresh. An example of such a selective refresh can be found in certain E-Ink display applications, such as one involving the selective refreshing of menu screens. Such targeted refresh effectively performs a quick image compare to determine which pixels of a given frame are different from the corresponding pixels of the previous frame so that a refresh-mask is produced. Using that mask, only the pixels that need refreshing will be updated, thus minimizing the energy update cost of the display 107. For most non-game/video applications, this can potentially be an enormous power savings since most pixels remain unchanged a screen refresh. So, in the context of the present disclosure, the selective refresh module 101c can operate on enlarged macro-pixels rather than individual pixels (e.g., as dictated by the DBPG module 105), thereby effectively reducing pixel interrogation and processing by a factor of 4 or better (assuming the minimum size for one macro-pixel is a 2×2 block of four individual pixels).

The second type of selective refresh that can be performed by the selective refresh module 101c is an intensity-based refresh that is configured to update pixels from one frame to the next based on the user perceived intensity values of pixels. In particular, a pixel of a given frame can be updated based on the user's perception of that pixel with respect to its neighboring pixels. To this end, the selective refresh module 101c determines which pixels can be displayed less intensely without the user observing a difference (or otherwise causing a negligible difference). For example, a dark blue pixel surrounded by all black pixels can be rendered as black, since most humans would have a difficult time perceiving any contrast between those two colors, particularly at a viewing distance in the range of 2 feet or so. So, using such knowledge about differences in perceived color intensities, the selective refresh module 101c can not only determine if a given pixel has changed, but can also determine if changing that pixel will be noticed by the user. Continuing with the blue/black pixel example, suppose that a dark blue pixel of one frame is to be changed to black in the next frame, and that the surrounding pixels are also black. The selective refresh module 101c could detect this scenario and recognize that refreshing this particular pixel will not be perceived by the user, and instead it will save energy by leaving that pixel untouched. Because of the blurring, neighboring pixels will appear more similar in intensity, which in turn allows the selective refresh module 101c more opportunities to detect perceived intensity similarities and can further reduce the number of pixels that need to be refreshed.

Methodology

Figure 2:
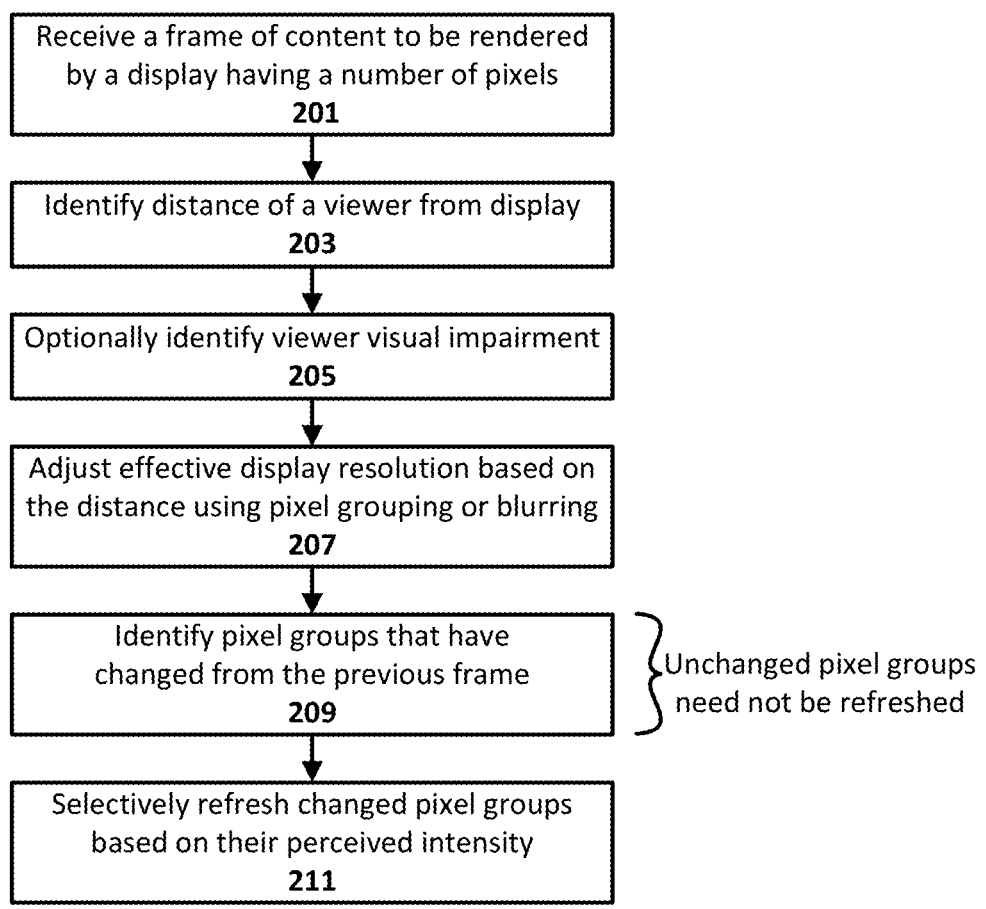
FIG. 2 illustrates a method for selectively refreshing a display based on viewer distance from the display, in accordance with an embodiment of the present disclosure.

FIG. 2 illustrates a method for selectively refreshing a display based on viewer distance from the display, in accordance with an embodiment of the present disclosure. The method can be carried out, for example, by the display system 100 shown in FIG. 2 or any other system having a display driver and display capable of selective pixel refreshing. The method may be implemented in software (e.g., display driver or other set of instructions non-transiently encoded on one or more computer readable mediums and executable by one or more processors). In other embodiments, the method can be implemented in hardware or firmware, or any combination of software, hardware, firmware, as will be appreciated in light of this disclosure.

The method includes receiving 201a frame of content data to be rendered by a display having an array of pixels. The size and actual resolution of the display can vary from one embodiment to the next and depending on the application (e.g., laptop, tablet, smartphone, etc). The method continues with identifying 203 the distance of the viewer from the display, and may optionally include identifying 205 any viewer visual impairment. In some embodiments, the distance of the viewer from the display can be determined automatically using input from a camera or other distance sensor, or manually based on user input. Alternatively, the distance can be hardcoded or otherwise assumed (e.g., 24 to 26 inches). In some cases, the viewer can be prompted to provide visual impairment information.

For instance, FIG. 5 illustrates an example user interface (UI) that can be used to configure a computing system for selectively refreshing a display based on viewer distance from the display, in accordance with an embodiment of the present disclosure. As can be seen, the UI includes a Display Driver Configuration page, which allows the user to enable the device to resize effective resolution of the display to conserve power (e.g., via the methodology of FIG. 2). In this example case, the user has checked a check box UI feature, thereby enabling the effective resolution of the display to be adjusted to conserve power. In addition, the user can indicate whether their system includes a distance sensor, by selecting the appropriate radio button. If not, then the user can use a pull-down menu to manually select the distance to be used. In this example case, the user has indicated the system includes a distance sensor, by selecting the 'Yes' radio button. As such, the UI features allowing for manual entry of that distance are grayed-out or otherwise diminished from view. In addition, this example embodiment allows the user to indicate if they wish to correct for a vision impairment, by selecting the appropriate radio button. If so, then the user can use a pull-down menu to identify the impairment (e.g., 20/40 vision). In this example case, the user has indicated she/he does not wish to correct for a vision impairment, by selecting the 'No' radio button. As such, the UI features allowing for entry of vision impairment are grayed-out. In some embodiments, the device carrying out the method (e.g., system 100) can be further configured to detect if the user is wearing corrective lens or contacts and gray-out the vision impairment options, or automatically treat the user as having perfect vision. The user-specific options in the UI may be customized and saved per user, where the system uses facial recognition or some other user identification techniques (e.g., such as login credentials, voice recognition, etc) to identify the user and revert the options to that user's preferences. Numerous other user interface configurations, layouts and UI control features can be used, as will be appreciated.

With further reference to FIG. 2, the method continues with adjusting 207 the effective display resolution based on the distance using pixel grouping or blurring (or both). In one embodiment, pixel grouping is carried out along the lines indicated in Table 1, as previously discussed. So, assuming the distance d is in the range of 15 to 22 inches, then the display is effectively re-pixelated using the corresponding lower resolution. For example, FIG. 4 illustrates a pixelated display that can be selectively refreshed in accordance with an embodiment of the present disclosure. As can be seen, the display includes an array of individual pixels, as any typical display may have. However, the methodology allows the driver to treat groups of pixels as a single pixel, by sending the same control signal to each of those individual pixels. In this example case, the groups of pixels are 2×2 blocks. These blocks are generally referred to herein as 'enlarged pixels' or 'macro-pixels' or 'effective pixels' so as to indicate that they are made up of two or more individual pixels. As will be appreciated, the typical distance d can vary depending on the given computing device's form factor and display size, and it may be desirable to have a higher effective resolution (smaller macro-pixels) for smaller displays as compared to the effective resolution of larger displays (which may user relatively larger macro-pixels, if so desired).

In another embodiment, rather than affirmatively grouping individual pixels, the display buffer 101d can be subjected to a blurring function so as to have a similar effect to grouping (because bigger pixels result). One example embodiment employs a Guassian blur, although any suitable such blur techniques can be used. For instance, the JPEG standard (and subsequently most all video codecs) has a number of blurring methods, such as down sampling and Discrete cosine transform. In general, down sampling operates on the premise that humans can perceive certain colors better than others, and discrete cosine transform essentially uses the Fast Fourier Transform to remove high frequency components that are not detectable by the human eye. Because of the blurring induced by such techniques, neighboring pixels will appear more similar in intensity, which in turn allows the selective refresh module 101c more opportunities to detect perceived intensity similarities and can further reduce the number of pixels that need to be refreshed.

With further reference to FIG. 2, the method continues with identifying 209 pixel groups that have changed from the previous frame. As previously explained, this can be carried out using any suitable image compare process to determine which pixel groups are different from the previous frame so that a refresh-mask is produced, in accordance with one embodiment. Using that mask, pixel groups that are unchanged from the previous frame are effectively hidden from or otherwise left out of the refresh process (because refreshing unchanged pixel groups will provide no visual benefit). Note that because of the change in effective resolution caused by the grouping, the number of compare decisions at 209 is smaller, as may be the number of resulting pixel groups that changed. In any case, pixel groups that have not changed need not be refreshed.

The example method further includes selectively refreshing 211 the changed pixel groups based on their perceived intensity. So, even if a pixel group has changed, if its neighboring pixels are sufficiently similar in intensity, then that pixel group and its similar neighboring pixel groups can be treated alike, much in the same way that the individual pixels making up a pixel group are treated. For example, assume a first pixel group has an average color of black and its neighboring pixel groups each have an average color of dark blue or black. In one such example case, the color of those collective pixel groups can be averaged, and all the individual pixels involved in that extended pixel group can receive the same drive signal (e.g., via a switching network wherein either each individual pixel receives a dedicated drive signal or a single drive signal is fanned-out to each individual pixel). Note that because of the unperceivable difference in intensities, the number of changed pixels that need refreshing at 209 is smaller. In addition, and as previously explained, pixel blurring can be used to effectively force neighboring pixels to become more similar in intensity, which allows for more such intensity-based refresh selectivity.

Figures 3A, 3B:
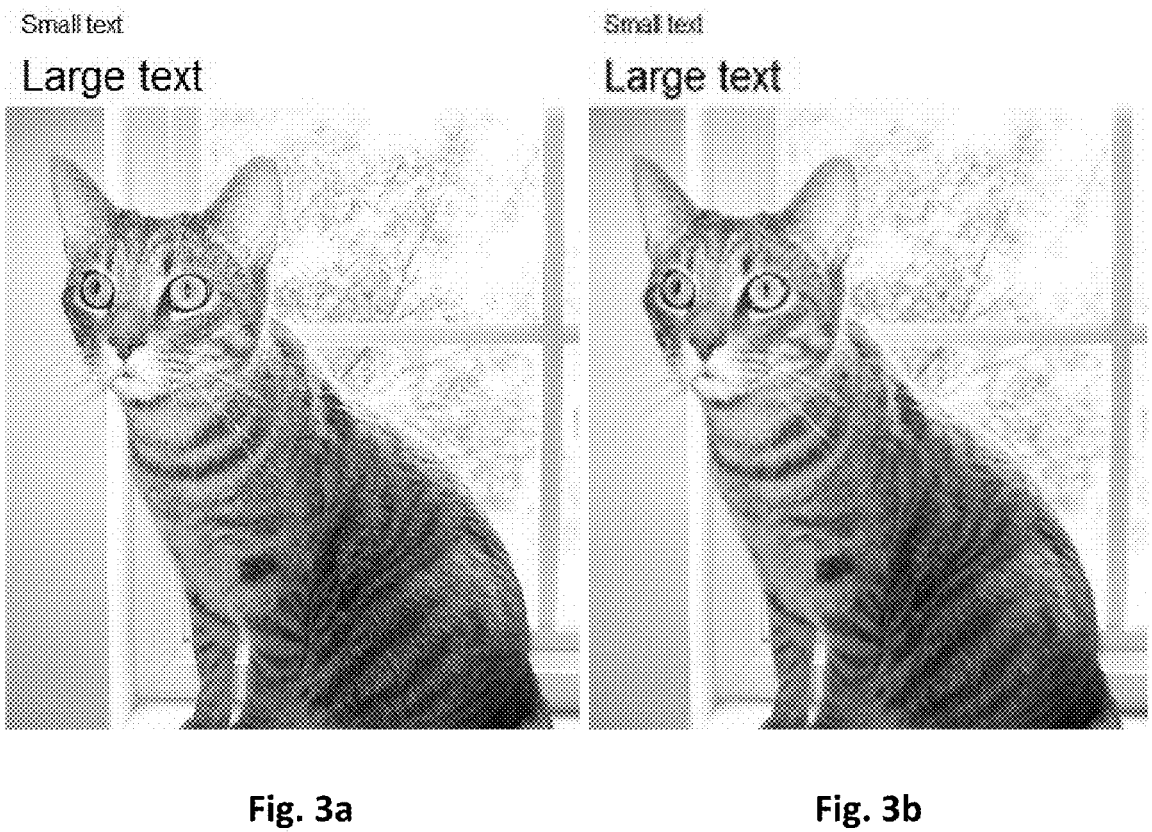
FIG. 3a illustrates an example image and text displayed using a typical refresh scheme.
FIG. 3b illustrates that same image and text displayed at a lower resolution to simulate its appearance if it were produced using a refresh scheme configured in accordance with an embodiment of the present disclosure.

FIG. 3a illustrates an example image and text displayed using a typical refresh scheme, and FIG. 3b illustrates that same image and text displayed at a lower resolution to simulate its appearance if it were produced using a refresh scheme configured in accordance with an embodiment of the present disclosure. While up close (e.g., within 12 inches of viewer's face, or closer), the image and text of FIG. 3b is clearly grainier and less crisp than the image and text of FIG. 3a. However, at a greater viewing distance (e.g., 24 to 30 inches), the graininess becomes less apparent and the FIG. 3b image and text looks more closely similar to the image and text of FIG. 3a.

Note that the techniques provided herein do not change how an image is rendered into the display buffer, as would be the case with DPI scaling (DPI=dots per inch). As is known, DPI scaling is an opt-in method that can be used by a viewer to make text more readable, by essentially changing the default font size to something larger. In contrast, an embodiment of the present disclosure takes whatever is being rendered and automatically determines how to update the display more energy efficiently without the user noticing a difference in what is being rendered (or with otherwise noticeable but negligible differences).

Example System

Figure 6:
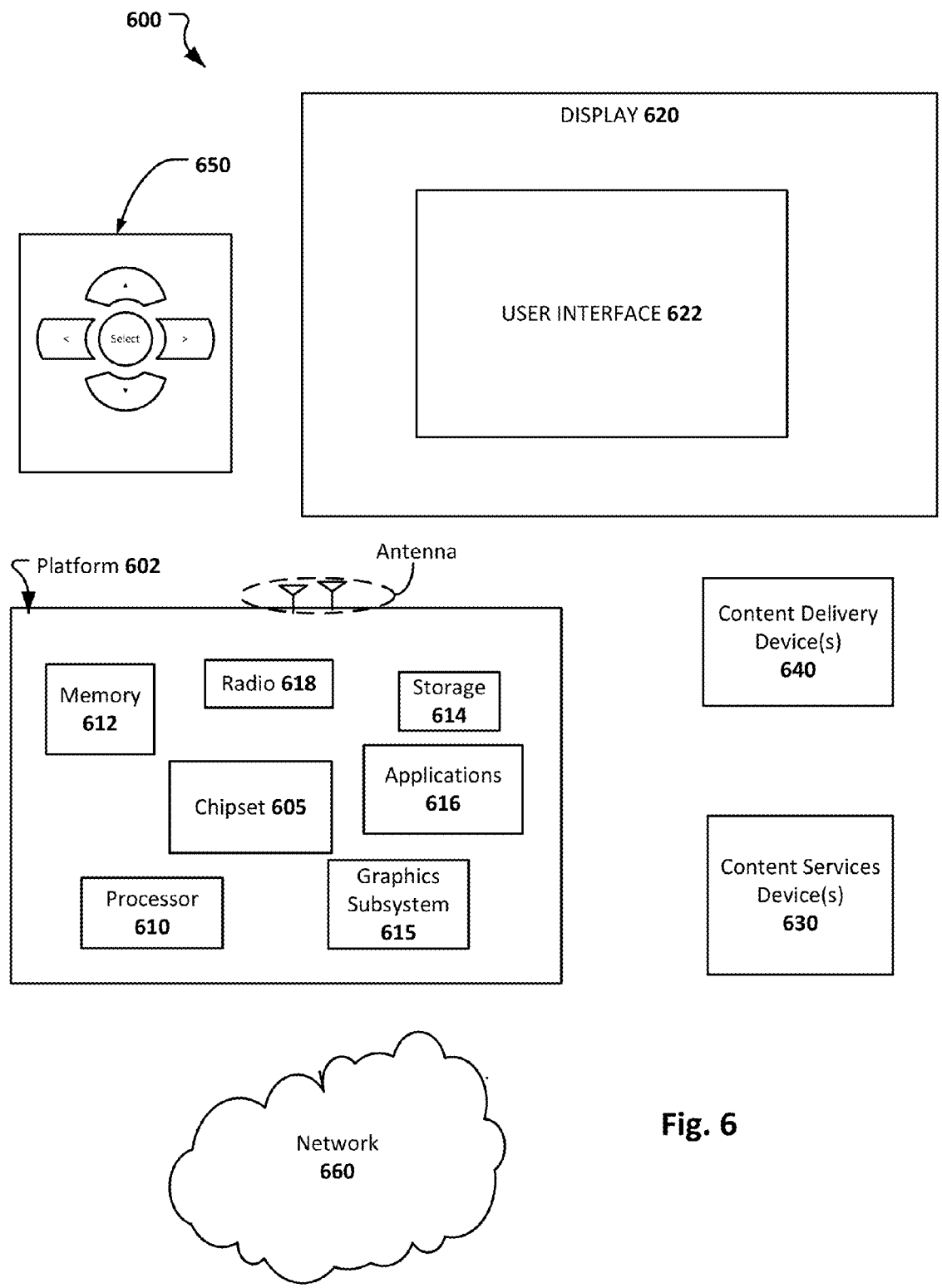
FIG. 6 illustrates a media system configured in accordance with an embodiment of the present disclosure.

FIG. 6 illustrates an example system 600 that may carry out distance-based selective refreshing of display 620 as described herein, in accordance with some embodiments. In some embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display, and in some embodiments is configured to carry out the adjusting of effective resolution and selective refresh based on viewing distance as variously described herein. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques described herein, including adjusting of effective resolution and selective refresh of display based on viewing distance, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display, but in one specific embodiment is a display that can be selective refreshed based on pixel changes from frame to frame. Display 620 may comprise, for example, a liquid crystal display (LCD) screen, electrophoretic display (EPD or liquid paper display, flat panel display, touch screen display, television-like device, and/or a television. Display 620 may be digital and/or analog. In some embodiments, display 620 may be a holographic or three-dimensional display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network

660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card. In one example embodiment, a driver programmed or otherwise configured to carry out the adjusting of effective resolution and selective refresh based on viewing distance as variously described herein.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

Figure 7:
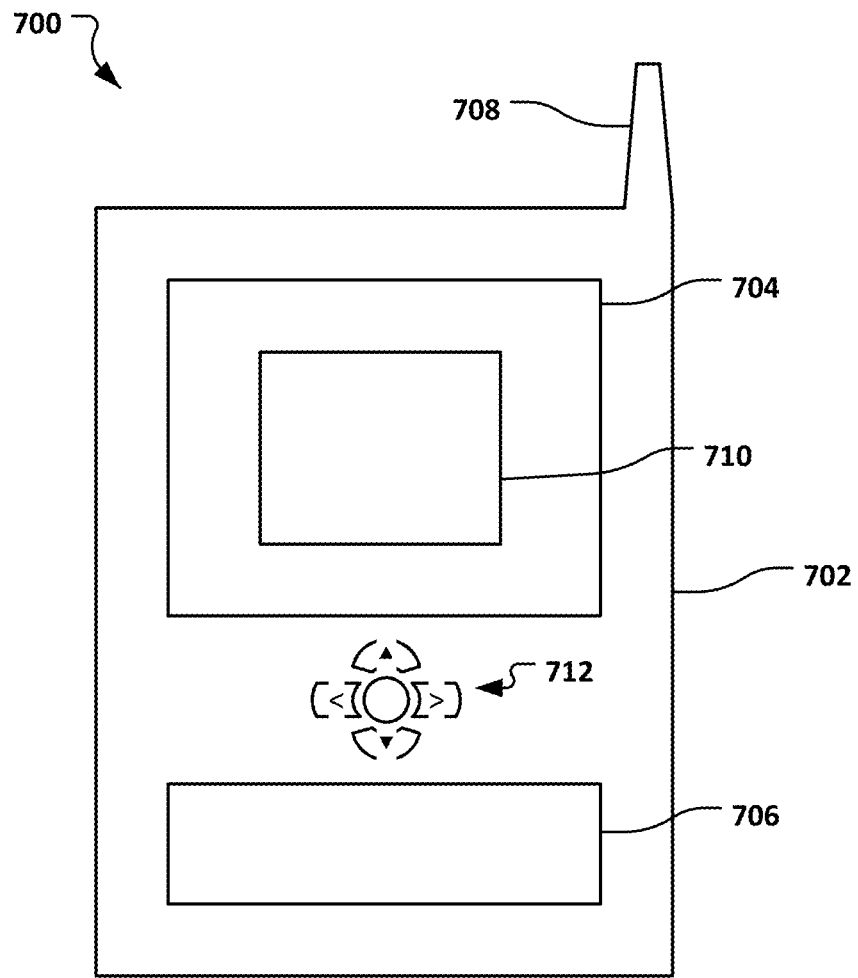
FIG. 7 illustrates a mobile computing system configured in accordance with an embodiment of the present disclosure.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device, which in one example embodiment is a pixelated display capable of selective refresh. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present invention. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 is a method for refreshing a display, comprising: identifying the distance of a viewer from a selectively refreshable display having an array of pixels; and automatically adjusting an effective resolution of the display based on the distance using pixel grouping or blurring or both.

Example 2 includes the subject matter of Example 1, further comprising: receiving a frame of content data to be rendered by the display.

Example 3 includes the subject matter of Example 1 or 2, further comprising: identifying pixel groups that have changed from the previous frame.

Example 4 includes the subject matter of any of the previous Examples, further comprising: selectively refreshing changed pixels and/or pixel groups based on their perceived intensity, wherein if an intensity change of a given pixel group from one frame to the next frame is below a given threshold, that pixel group is not refreshed.

Example 5 includes the subject matter of any of the previous Examples, wherein the distance of the viewer from the display is determined automatically using input from a distance sensor.

Example 6 includes the subject matter of Example 5, wherein the distance sensor comprises at least one of a camera, an infrared distance sensor, and an ultrasonic sensor.

Example 7 includes the subject matter of any of the previous Examples, wherein the distance of the viewer from the display can be determined based on user input.

Example 8 includes the subject matter of any of the previous Examples, wherein the distance of the viewer from the display can be assumed to be within a given range.

Example 9 includes the subject matter of Example 8, wherein the given range is 18 to 30 inches. Other suitable ranges will be apparent in light of this disclosure.

Example 10 includes the subject matter of any of the previous Examples, further comprising: identifying a visual impairment of the viewer.

Example 11 includes the subject matter of any of the previous Examples, wherein the method is user-configurable with respect to at least one of: the method being activated or not; the distance of the viewer from the display user interface; and whether or not the viewer has a visual impairment.

Example 12 includes the subject matter of any of the previous Examples, wherein adjusting the effective display resolution uses pixel grouping such that each pixel group includes two or more pixels, and each individual pixel within a given group is set to the same color.

Example 13 includes the subject matter of Example 12, wherein the color of the pixels in the given group is an average of colors represented by individual pixels of the group before the adjusting. Other examples may include a blend of the colors, such as a blend that assumes equal portions of each color.

Example 14 includes the subject matter of Example 12 or 13, wherein the given group is a 2×2 array of individual pixels.

Example 15 includes the subject matter of Example 12 or 13, wherein the given group is an asymmetric array of individual pixels.

Example 16 includes the subject matter of any of Examples 12-15, wherein adjusting the effective display resolution further uses blurring so that neighboring pixel groups will appear more similar in intensity.

Example 17 includes the subject matter of any of Examples 1-15, wherein adjusting the effective display resolution uses blurring so that neighboring pixels will appear more similar in intensity, the method further comprising: selectively refreshing changed pixels based on their perceived intensity difference with respect to intensity of neighboring pixels.

Example 18 includes a display system configured to carry out the method of any of Examples 1-17.

Example 19 includes a display driver configured to carry out the method of any of Examples 1-17.

Example 20 includes a non-transient computer program product encoded with instructions that when executed by one or more processors cause a process to be carried out, the process comprising: identify the distance of a viewer from a selectively refreshable display having an array of pixels; and automatically adjust an effective resolution of the display based on the distance using pixel grouping or blurring or both. The computer program product can be one or more non-transient computer readable mediums.

Example 21 includes the subject matter of Example 20, the process further comprising: receive a frame of content data to be rendered by the display.

Example 22 includes the subject matter of Examples 20 or 21, the process further comprising: identify pixel groups that have changed from the previous frame.

Example 23 includes the subject matter of any of Examples 20-22, the process further comprising: selectively refresh changed pixels and/or pixel groups based on their perceived intensity, wherein if an intensity change of a given pixel group from one frame to the next frame is below a given threshold, that pixel group is not refreshed.

Example 24 includes the subject matter of any of Examples 20-23, wherein the distance of the viewer from the display is determined automatically using input from a distance sensor.

Example 25 includes the subject matter of Example 24, wherein the distance sensor comprises at least one of a camera, an infrared distance sensor, and an ultrasonic sensor.

Example 26 includes the subject matter of any of Examples 20-25 wherein the distance of the viewer from the display can be determined based on user input.

Example 27 includes the subject matter of any of Examples 20-26 wherein the distance of the viewer from the display can be assumed to be within a given range.

Example 28 includes the subject matter of Example 27 wherein the given range is 18 to 30 inches.

Example 29 includes the subject matter of any of Examples 20-28, the process further comprising: identify a visual impairment of the viewer.

Example 30 includes the subject matter of any of Examples 20-29, the process further comprising: present a user interface configured to provide user-configurability with respect to at least one of: the process being activated or not; the distance of the viewer from the display user interface; and whether or not the viewer has a visual impairment.

Example 31 includes the subject matter of any of Examples 20-30, wherein adjusting the effective display resolution uses pixel grouping such that each pixel group includes two or more pixels, and each individual pixel within a given group is set to the same color.

Example 32 includes the subject matter of Example 31, wherein the color of the pixels in the given group is an average (or other blend) of colors represented by individual pixels of the group before the adjusting.

Example 33 includes the subject matter of Example 31 or 32, wherein the given group is a 2×2 array of individual pixels.

Example 34 includes the subject matter of any of Example 31 or 32, wherein the given group is an asymmetric array of individual pixels.

Example 35 includes the subject matter of any of Examples 31-34, wherein adjusting the effective display resolution further uses blurring so that neighboring pixel groups will appear more similar in intensity.

Example 36 includes the subject matter of any of Examples 31-34, wherein adjusting the effective display resolution uses blurring so that neighboring pixels will appear more similar in intensity, the process further comprising: selectively refresh changed pixels based on their perceived intensity difference with respect to intensity of neighboring pixels.

Example 37 includes a system for refreshing a display, comprising: a processor; and a display driver controllable at least in part by the processor and configured to, based on the distance of a viewer from a selectively refreshable display having an array of pixels, automatically adjust an effective resolution of the display using pixel grouping or blurring or both.

Example 38 includes the subject matter of Example 37, wherein the display driver includes: a display buffer configured to receive a frame of content data to be rendered by the display. Alternatively, Example 38 includes the subject matter of Example 37, wherein the system includes at least one of: a network interface operatively coupled to the processor; a display operatively coupled to the processor; a display buffer configured to receive a frame of content data to be rendered by the display.

Example 39 includes the subject matter of Example 37 or 38, further comprising: a selective refresh module configured to identify pixel groups that have changed from the previous frame.

Example 40 includes the subject matter of any of Examples 37-39, further comprising: a selective refresh module configured to selectively refresh changed pixels and/or pixel groups based on their perceived intensity, wherein if an intensity change of a given pixel group from one frame to the next frame is below a given threshold, that pixel group is not refreshed.

Example 41 includes the subject matter of any of Examples 37-40, further comprising a distance sensor configured to indicate the distance of the viewer from the display.

Example 42 includes the subject matter of Example 41, wherein the distance sensor comprises at least one of a camera, an infrared distance sensor, and an ultrasonic sensor.

Example 43 includes the subject matter of any of Examples 37-42, wherein the distance of the viewer from the display can be determined based on user input.

Example 44 includes the subject matter of any of Examples 37-43, wherein the distance of the viewer from the display is assumed to be within a given range.

Example 45 includes the subject matter of Example 44, wherein the given range is 18 to 30 inches.

Example 46 includes the subject matter of any of Examples 37-45, wherein the system is further configured to identify a visual impairment of the viewer.

Example 47 includes the subject matter of any of Examples 37-46, wherein the system is user-configurable with respect to at least one of: distance-based effective resolution adjustment being activated or not; the distance of the viewer from the display user interface; and whether or not the viewer has a visual impairment.

Example 48 includes the subject matter of any of Examples 37-47, wherein the display driver is configured to adjust the effective display resolution using pixel grouping such that each pixel group includes two or more pixels, and each individual pixel within a given group is set to the same color.

Example 49 includes the subject matter of Example 48, wherein the color of the pixels in the given group is an average (or other blend) of colors represented by individual pixels of the group before the adjusting by the display driver.

Example 50 includes the subject matter of Example 48 or 49, wherein the given group is a 2×2 array of individual pixels.

Example 51 includes the subject matter of Example 48 or 49, wherein the given group is an asymmetric array of individual pixels.

Example 52 includes the subject matter of any of Examples 48-51, wherein the display driver is further configured to adjust the effective display resolution using blurring so that neighboring pixel groups will appear more similar in intensity.

Example 53 includes the subject matter of any of Examples 37-51, wherein the display driver is configured to adjust the effective display resolution using blurring so that neighboring pixels will appear more similar in intensity, the driver comprising: a selective refresh module configured to selectively refresh changed pixels based on their perceived intensity difference with respect to intensity of neighboring pixels.

Example 54 includes an integrated circuit or chipset comprising the system of any of Examples 37-53.

Example 55 includes a graphics card comprising the system of any of Examples 37-54.

Example 56 includes a display driver card comprising the system of any of Examples 37-55.

Example 57 includes a display comprising the system of any of Examples 37-56.

Example 58 includes a mobile computing device comprising the system of any of Examples 37-57.

Example 59 includes a graphical user interface comprising the system of any of Examples 37-57.

Example 60 includes the subject matter of any of Examples 37-56 or 58-59, further comprising the selectively refreshable display having an array of pixels.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for refreshing a display, comprising:
identifying the distance of a viewer from a selectively refreshable display having an array of pixels;
automatically adjusting an effective resolution of the display based on the distance using pixel grouping or blurring or both, to generate macro pixels based on a plurality of smaller pixels; and
selectively refreshing the macro pixels changed by the adjusting, based on a comparison of intensity of the macro pixels with respect to intensity of adjacent macro pixels, in the same frame.

2. The method of claim 1, further comprising:
receiving a frame of content data to be rendered by the display; and
identifying pixel groups that have changed from the previous frame.

3. The method of claim 2 wherein selectively refreshing pixels changed by the adjusting based on their intensity difference with respect to intensity of neighboring pixels comprises:
selectively refreshing changed pixels and/or pixel groups based on their intensity, wherein in response to an intensity change of a given pixel group from one frame to the next frame being below a given threshold, that pixel group is not refreshed.

4. The method of claim 1 wherein the distance of the viewer from the display is determined automatically using input from a distance sensor.

5. The method of claim 4 wherein the distance sensor comprises at least one of a camera, an infrared distance sensor, and an ultrasonic sensor.

6. The method of claim 1 wherein the distance of the viewer from the display is determined based on user input or is within a given range.

7. The method of claim 1, further comprising:
identifying a visual impairment of the viewer.

8. The method of claim 1 wherein the method is user-configurable with respect to at least one of: the method being activated or not; the distance of the viewer from the display user interface; and whether or not the viewer has a visual impairment.

9. The method of claim 1 wherein adjusting the effective display resolution uses pixel grouping such that each pixel group includes two or more pixels, and each individual pixel within a given group is set to the same color.

10. The method of claim 9 wherein the color of the pixels in the given group is an average of colors represented by individual pixels of the group before the adjusting.

11. The method of claim 9 wherein adjusting the effective display resolution further uses blurring so that neighboring pixel groups will appear more similar in intensity.

12. At least one non-transitory computer readable medium encoded with instructions that when executed by one or more processors cause a process to be carried out, the process comprising:
identify the distance of a viewer from a selectively refreshable display having an array of pixels;
automatically adjusting an effective resolution of the display based on the distance using pixel grouping or blurring or both, to generate macro pixels based on a plurality of smaller pixels; and
selectively refresh the macro pixels changed by the adjusting, based on a comparison of intensity of the macro pixels with respect to intensity of adjacent macro pixels, in the same frame.

13. The computer readable medium of claim 12, the process further comprising:
   receive a frame of content data to be rendered by the display;
   identify pixel groups that have changed from the previous frame; and
   selectively refresh changed pixels and/or pixel groups based on their intensity, wherein in response to an intensity change of a given pixel group from one frame to the next frame being below a given threshold, that pixel group is not refreshed.

14. The computer readable medium of claim 12 wherein the distance of the viewer from the display is determined automatically using input from a distance sensor.

15. The computer readable medium of claim 12, the process further comprising:
   identify a visual impairment of the viewer.

16. The computer readable medium of claim 12, the process further comprising:
   present a user interface configured to provide user-configurability with respect to at least one of: the process being activated or not; the distance of the viewer from the display user interface; and whether or not the viewer has a visual impairment.

17. The computer readable medium of claim 12 wherein adjusting the effective display resolution uses pixel grouping such that each pixel group includes two or more pixels, and each individual pixel within a given group is set to the same color, wherein the color of the pixels in the given group is a blend of colors represented by individual pixels of the group before the adjusting.

18. The computer readable medium of claim 17 wherein adjusting the effective display resolution further uses blurring so that neighboring pixel groups will appear more similar in intensity.

19. A system for refreshing a display, comprising:
   a processor; and
   a display driver at least one of executable and controllable at least in part by the processor and configured to, based on the distance of a viewer from a selectively refreshable display having an array of pixels:
      automatically adjust an effective resolution of the display using pixel grouping or blurring or both, to generate macro pixels based on a plurality of smaller pixels, so that neighboring pixels will appear more similar in intensity; and
      selectively refresh the macro pixels changed by the adjusting, based on a comparison of intensity of the macro pixels with respect to intensity of adjacent macro pixels, in the same frame.

20. The system of claim 19 wherein the system further includes at least one of:
   a network interface operatively coupled to the processor;
   the display operatively coupled to the processor;
   a display buffer configured to receive a frame of content data to be rendered by the display; and
   a distance sensor configured to indicate the distance of the viewer from the display;
   wherein the display driver is configured to identify pixel groups that have changed from the previous frame, and to selectively refresh changed pixels and/or pixel groups based on their intensity, wherein in response to an intensity change of a given pixel group from one frame to the next frame being below a given threshold, that pixel group is not refreshed.

21. The system of claim 19 wherein the display driver is configured to adjust the effective display resolution using pixel grouping such that each pixel group includes two or more pixels, and each individual pixel within a given group is set to the same color, wherein the color of the pixels in the given group is a blend of colors represented by individual pixels of the group before the adjusting by the display driver.

* * * * *